A. L. LEWIS.
VEHICLE SEAT.
APPLICATION FILED AUG. 1, 1918.

1,304,072.

Patented May 20, 1919.
2 SHEETS—SHEET 1.

Witness
C. D. Kesler

Inventor
Andrew L. Lewis
By Charles L. Norris
Attorney

A. L. LEWIS.
VEHICLE SEAT.
APPLICATION FILED AUG. 1, 1918.
1,304,072.
Patented May 20, 1919.
2 SHEETS—SHEET 2.
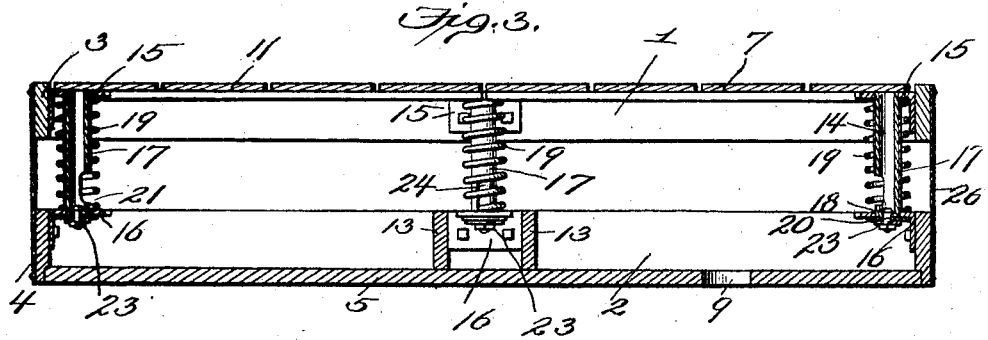
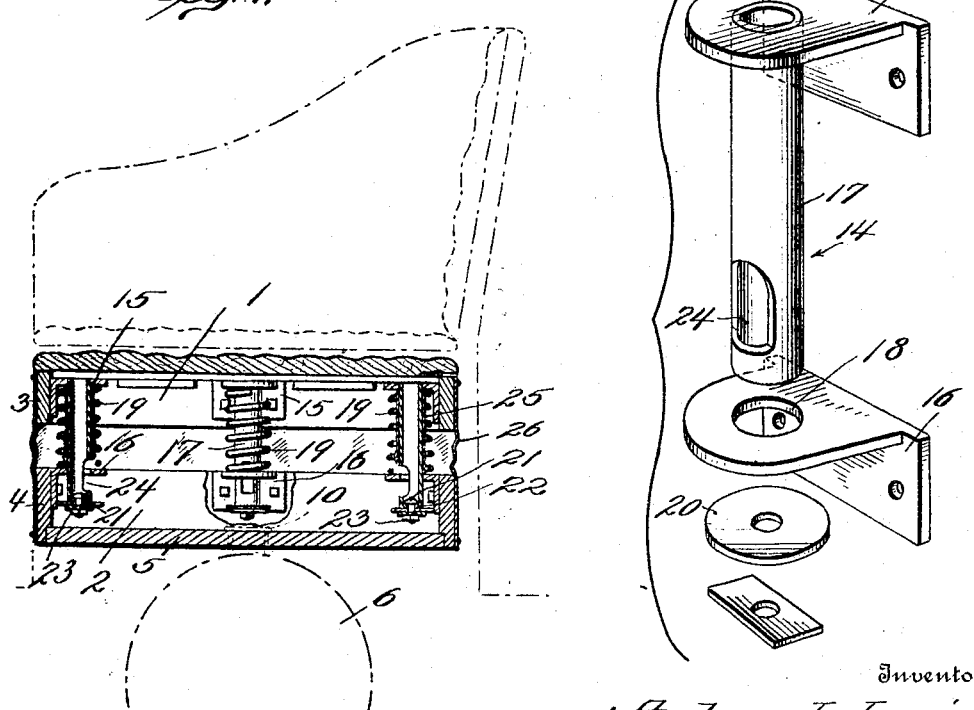
Inventor
Andrew L. Lewis
Witness
By
Attorney

UNITED STATES PATENT OFFICE.

ANDREW L. LEWIS, OF PETERSBURG, VIRGINIA.

VEHICLE-SEAT.

1,304,072.   Specification of Letters Patent.   Patented May 20, 1919.

Application filed August 1, 1918. Serial No. 247,796.

*To all whom it may concern:*

Be it known that I, ANDREW L. LEWIS, a citizen of the United States, residing at Petersburg, in the county of Dinwiddie and State of Virginia, have invented new and useful Improvements in Vehicle-Seats, of which the following is a specification.

My present invention relates to improvements in seats for vehicles and more especially automobiles, and the primary objects of the invention are to provide a novel and improved seat of this class which avoids dislocation of the cushioning springs and breaking or tearing of the leather or other covering by the action of the springs which are objectionable features of upholstered seats of this class as heretofore made; to provide a seat which may be readily applied to an automobile body in the first instance or as a substitute for worn seats and which will be durable and will retain its shape, the improved seat affording ample or an increased degree of cushioning action; and, furthermore, to provide a seat of this character wherein the seat cushions are hinged thereto to permit access to the fuel tank or to a tool or other storage compartment provided within the body of the seat.

To these and other ends, the invention consists in certain improvements, and combinations and arrangements of parts, all as will be hereinafter more fully described, the novel features being pointed out particularly in the claims at the end of the specification.

In the accompanying drawings:

Fig. 3 represents a vertical section taken centrally through the seat as shown in Figs. 1 and 2.

Figure 1:
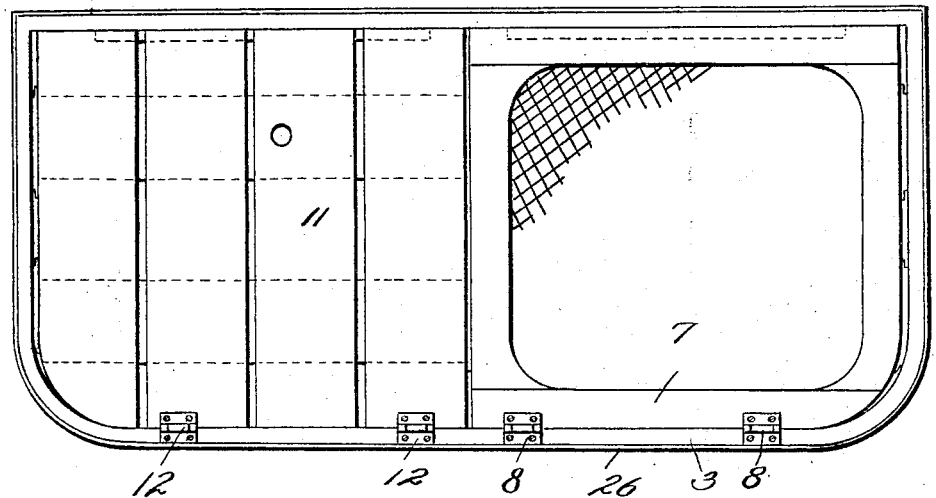
Figure 1 is a top plan view of a vehicle seat constructed in accordance with the present invention, a seat covering being applied to one side of the seat and the covering being omitted from the other side thereof.
Figure 2:
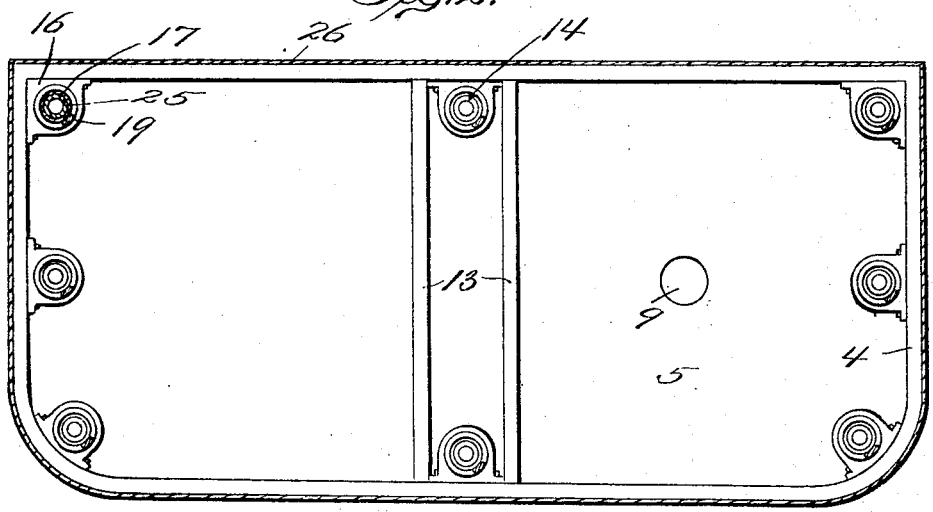
Fig. 2 represents a horizontal section taken through the seat at a point midway of its height.

Fig. 4 represents a transverse vertical section taken through the seat, the full and dotted lines showing the cushioning action afforded by the seat under the weight of a person seated thereon, the relation of the seat to the body of the vehicle being indicated by the dot-and-dash lines; and Fig. 5 is a collective view showing, in perspective, the parts comprising one of the spring mountings which relatively guide the sections of the seat and limit the expansion of the seat under the action of the springs.

Seats constructed in accordance with the present invention are capable of use for various purposes although they are particularly adapted for use in automobiles. The preferred embodiment of the invention is shown in the accompanying drawings and will be hereinafter described in detail. It is to be understood, however, that the invention is not restricted to the precise construction shown, as equivalent constructions are contemplated and will be included within the scope of the claims.

In the present instance the seat comprises upper and lower sections 1 and 2, these sections being conveniently made of wood. Preferably, and as shown, the upper section comprises a frame 3 and the lower section comprises a similar frame 4, the bottom of the lower section being closed by a board 5 which is secured to the frame 4. The seat is adapted to fit into the body of the vehicle in place of the usual upholstered seat, and in those instances where the seat is placed above a fuel tank, such as that indicated at 6 in Fig. 4, access to the fuel tank may be obtained by providing the upper section 1 with a top 7 which may be connected to the rear side of the frame 3 by hinges 8. The bottom board 5 of the seat may also be provided with an opening 9 through which access may be had to the filler cap 10 of the fuel tank. The space between the seat sections may also be utilized for the storage of tools or other articles, and to permit access to this storage space the seat is provided with a lid or top 11 which may also be connected to the rear side of the frame 3 by hinges 12. The lids 7 and 11 may be provided with any suitable seat coverings, cane being appropriate. In those cases where access to the fuel tank is unnecessary, the lids or covers 7 and 11 may be formed in one piece and hinged to the rear side of the frame 3, and the one-piece cover may be provided with a single covering cushion. Where, as in the present instance, access to the fuel tank is provided at one side of the seat, the storage space at the opposite side of the seat is preferably separated therefrom by partitions 13, these partitions also serving to reinforce the lower seat section.

The spring cushioning means provided by the present invention connect the upper and lower sections of the seat, permitting the upper section to yield under the weight of a person or persons sitting thereon, and the cushioning means also serves to guide the upper seat section in its movements and to limit its upward movement under the action of the cushioning springs. In the present instance the cushioning means comprises a set of cushioning devices 14, these cushioning devices being placed preferably at the four corners of the seat and also at points intermediate of the sides and ends of the seat. Each cushioning device comprises a pair of brackets 15 and 16, the bracket 15 being fastened by screws or other means to the inside of the frame 3 of the upper section, and the bracket 16 being fastened by screws or other means to the inside of the frame 4 of the lower seat section. The upper bracket 15 has a tubular stem 17 connected rigidly thereto and projecting downwardly therefrom, and the bracket 16 has an aperture 18 through which the stem 17 is movable vertically, the telescopic fit between the stem 17 and the bracket 16 serving to guide the upper seat section in its vertical movements. A coiled compression spring 19 encircles the stem 17 and its ends bear against the brackets 15 and 16 respectively, the expansive tendency of this spring acting to hold the upper section of the seat normally in elevated position and affording resilience for the depression of the upper seat section when the weight of a person or persons is imposed thereon. The upward movement of the upper seat section, however, is limited by a washer 20 which is secured to the lower end of the stem 17 by a bolt 21, the latter extending through the closed bottom 22 of the stem 17 and having a nut 23 on its lower end which serves to secure the washer to the stem. An opening 24 may be formed in the stem above its lower end to permit the insertion of the bolt 21. With this arrangement, the washer 20 will abut against the under side of the bracket 16 when the upper seat section reaches a predetermined point in its upward movement, thereby preventing further upward movement of the upper section of the seat under the action of the cushioning springs. In order to prevent rubbing or binding of the spring upon the stem, the latter is preferably surrounded by a sleeve 25 which may be composed of fabric, leather or other relatively soft material, this sleeve serving to prevent contact of the spring with the stem and thus avoiding noises which would otherwise result. A covering 26 of leather, fabric or other suitable flexible material is applied to the outer sides of the upper and lower seat sections, this covering bridging the space between the sections. The part of this covering bridging the space between the seat sections will collapse or fold when the upper seat section is depressed and it will be tightened or stretched when the upper seat section rises to its upper limit. By means of the covering 26, the seat sections are formed as an inclosure wherein the brackets 15 and 16 and their coöperating parts are disposed and protected.

A vehicle seat made in accordance with the present invention is superior to the usual upholstered spring seats as heretofore used generally in automobiles and other vehicles, in the respects that it will retain its shape permanently, it is more durable, it affords more cushioning action than is obtained from many of the seats heretofore used in automobiles, and, furthermore, it provides useful storage space which is not obtained from seats of the usual type. Also, the seat is complete and capable of being placed in the body of an automobile as a substitute for the usual seat without requiring any alteration of the automobile body to accommodate it.

What is claimed is:

1. A vehicle seat comprising relatively movable upper and lower seat sections each comprising a surrounding frame provided with flexible connecting means producing an inclosure, and devices secured respectively to the inner side of the frames of the upper and lower sections, each device embodying a cushion acting to lift the upper section relatively to the lower section, a guide for the vertically movable upper section, and a stop for limiting the upward movement of the upper section, the guide and stop being inclosed within the sections.

2. A vehicle seat comprising upper and lower sections provided with flexible connecting means to produce an inclosure, and a plurality of devices connecting said sections and inclosed by the latter and the connecting means, each of said devices embodying a pair of brackets fixed to the respective seat sections, a tubular stem on one of said brackets movable telescopically through the other bracket, a coiled compression spring encircling said stem and bearing against the respective brackets, and a stop fixed to said stem beyond the bracket through which it movably extends and arranged to abut against said latter bracket to limit the upward movement of the upper seat section.

3. A cushioning, guiding and motion-limiting device for vehicle seats of the type comprising upper and lower movable sections, said device embodying a pair of brackets adapted for attachment to the respective seat sections, a tubular stem being fixed to one of said brackets and movable telescopically through the other bracket, the free end of said stem having an apertured head and the side of the stem adjacent to said head having an opening, a bolt insertible into the aperture of the head of the stem through said opening in the side of the stem, a washer secured to the end of said stem by said bolt, and a coil spring encircling said stem and bearing against said brackets to relatively separate them.

In testimony whereof I have hereunto set my hand in presence of two subscribing witnesses.

ANDREW L. LEWIS.

Witnesses:
S. R. GRESHAM,
H. D. YOUNG.